June 13, 1944.　　　H. E. BRELSFORD　　　2,351,100
PRISMATIC ACCUMULATOR GAUGE
Filed Dec. 2, 1941　　　2 Sheets-Sheet 1
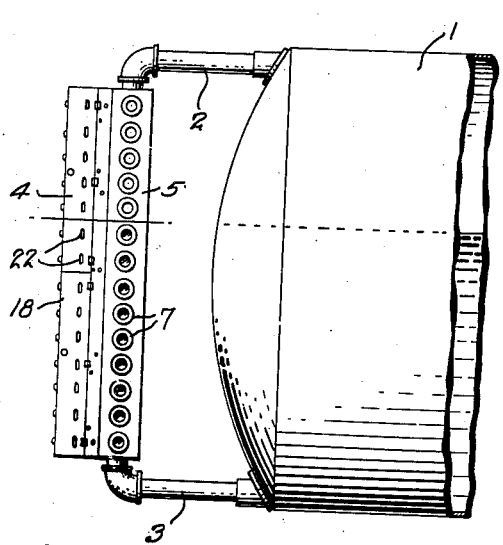
Fig. 1.
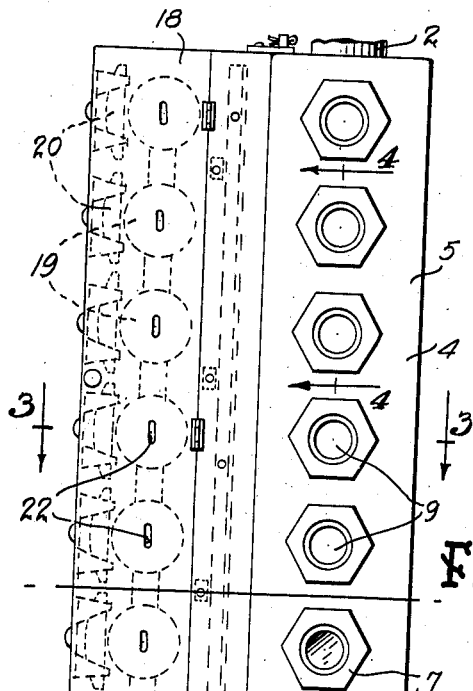
Fig. 2.
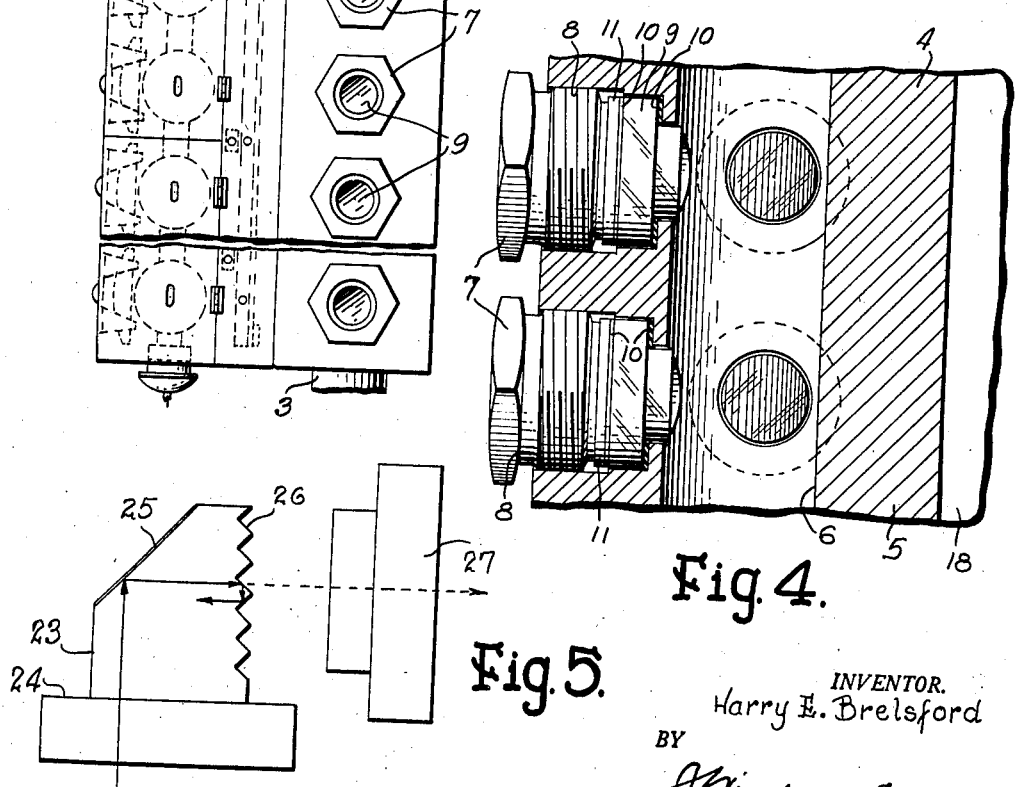
Fig. 4.
Fig. 5.
INVENTOR.
Harry E. Brelsford
BY
Attorney

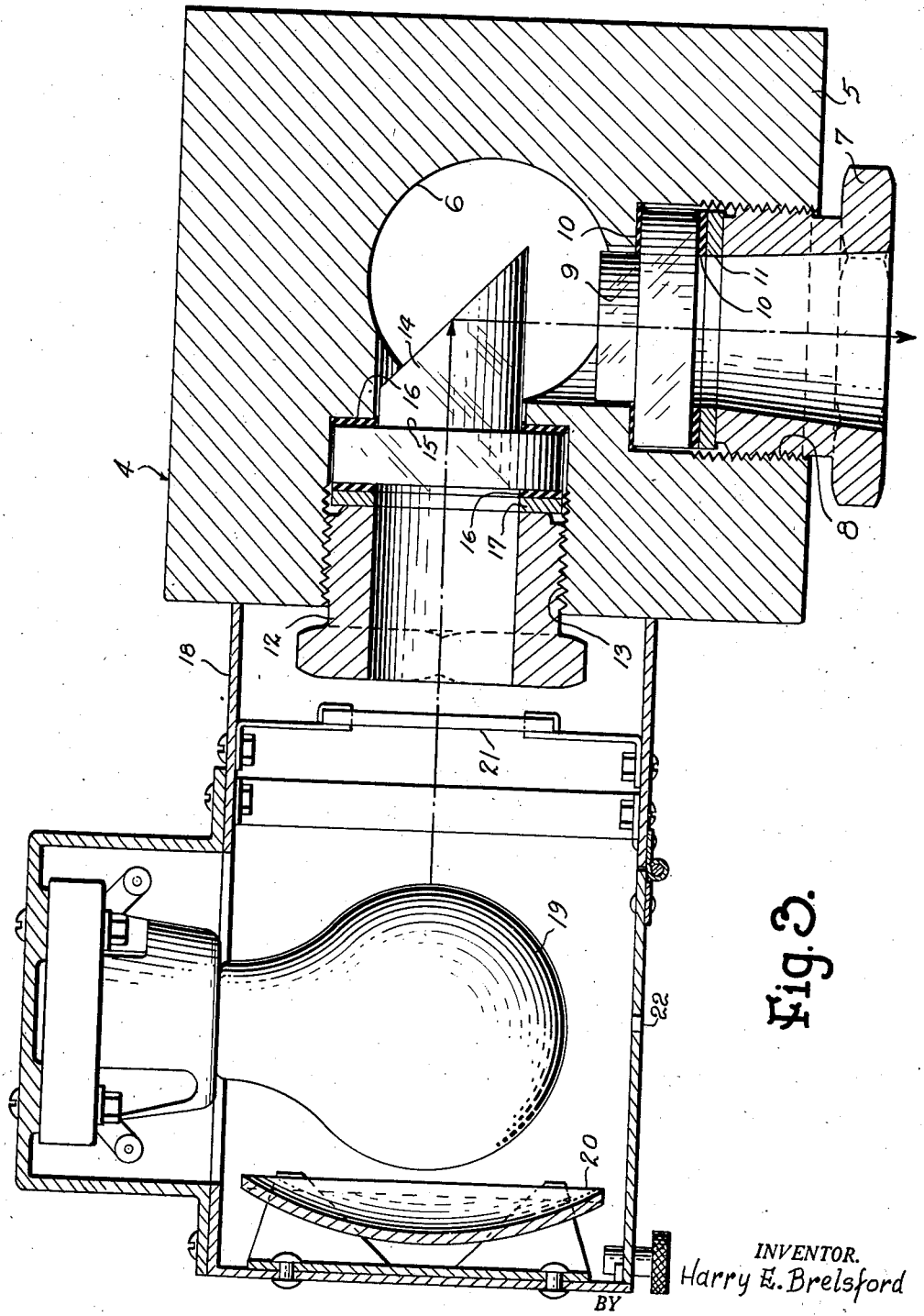

Patented June 13, 1944

2,351,100

UNITED STATES PATENT OFFICE 2,351,100

PRISMATIC ACCUMULATOR GAUGE

Harry E. Brelsford, Birmingham, Mich., assignor to Diamond Power Specialty Corporation, Detroit, Mich., a corporation of Michigan Application December 2, 1941, Serial No. 421,387

4 Claims. (Cl. 73—293)

This invention relates to water level gauges and is particularly adapted for use on hydraulic pressures which may run very high but where temperatures above the boiling point are not involved, as a rule.

There are many high pressure hydraulic installations in which it is not necessary to have accurate, constant information on the exact water level, but in which it is highly important to know the approximate level. Gauges capable of indicating the level of liquids at high pressure are on the market but they are all of expensive design. A principal object of this invention is to provide a gauge which will show the liquid level reliably, but without extreme constant accuracy, and which can be constructed at substantially reduced cost.

Another object is to provide a gauge having a plurality of windows through which observations may be made, each window having a source of light available for sending rays thereto and to incorporate in the gauge between each window and its light source a means capable of responding to its immersion or freedom from contact by the hydraulic liquid to affect the manner of its transmission of the light rays.

More particularly, it is an object of the invention to provide a glass for each of a series of windows, each glass being arranged to divert the light rays from its individual light source toward its window, or not, depending on whether or not it is immersed in the hydraulic fluid. I prefer to use glasses of cylindrical form truncated at an angle of 45°, hereinafter referred to as reflecting prisms. Advantage is taken of the fact that a reflecting prism will reflect a light ray at an angle such that the angle of incidence is equal to the angle of departure, but that this rule is nullified where the lens is immersed in a clear liquid having a generally similar index of refraction to the material of the lens. For instance, a glass lens immersed in water will not respond to the rule.

Other objects and advantages will become more fully apparent as reference is had to the accompanying drawings, wherein my invention is illustrated, and in which Fig. 1 is a fragmentary side elevation of a pressure tank having my improved gauge mounted thereon, the gauge being shown in normal frontal view, Fig. 2 is an enlarged frontal view of the gauge, Fig. 3 is an enlarged horizontal section taken along the line 3—3 of Fig. 2, Fig. 4 is a vertical section taken along the line 4—4 of Fig. 2, and Fig. 5 illustrates a modification of the optical system, two glasses being shown in side elevation.

More particularly, 1 indicates a reservoir or tank or any convenient portion of a liquid system at which it is desired to read the level of liquid therein. Two pipes 2 and 3 connect the reservoir 1 with the gauge 4 which forms the subject of my invention.

The gauge 4 is composed of a gauge body 5 having a central bore or passageway 6 longitudinally therethrough communicating with pipes 2 and 3. Along the body 5 are a plurality of windows each formed by a hollow plug 7 threaded into an opening 8 leading into the bore 6 and a sight glass 9. Gaskets 10 are placed inwardly and outwardly of each glass to accept the pressure imposed thereon by the plug and a hard metal washer 11 separates the plug 7 from its adjacent gasket 10 to prevent damage to the gasket by abrasion. These windows may be spaced a few inches apart where information as to exact liquid level is not essential. Greater accuracy of reading will be obtained where they are inserted with a minimum of spacing and the accuracy may be further improved by staggering the windows with respect to each other so that the bottom of one will overlap the top of another.

At the level of each window a window for a reflecting prism is provided. With the prism type of light controlling means here illustrated in which the reflective surface of the reflecting prism is at 45°, the reflecting prism windows will be at right angles to the vision windows, above described. These windows are each formed by a hollow plug 12 screw threaded into an opening 13 through the gauge body 5 at the height or level of its corresponding vision window, and a reflecting prism 14 having a shouldered portion 15 as a positioning means. Gaskets 16 are provided inwardly and outwardly of each portion 15 to accept the pressures of the plug 12 and a hard metal washer 17 is inserted between each plug 12 and its adjacent washer 16 to prevent damage to the gasket by abrasion. The outer end or truncated surface of the reflecting prism terminates in a plane which forms a 45° angle with the axis of the reflecting prism window and with the axis of the vision window. The base of each reflecting prism is normal to the axis of one window, the axis of the opposite window is normal to the elements of the reflecting prism and the truncated surface is at an angle of 45° to both axes.

Secured to the gauge body 5 on the side thereof containing the reflecting prism windows is an electric lamp housing 18 having a plurality of lamps 19 therein, the center of each lamp being intersected by the axis of a reflecting prism window. A parabolic reflector 20 is carried by the casing 18 for each lamp, the reflectors each being arranged to focus the rays of its lamp on a reflecting prism 14.

Between each lamp 19 and its reflecting prism 14 is a filter 21 which permits only the red rays from the lamp to pass therethrough. An opening 22 through the casing 18 is provided adjacent each lamp 19.

The operation is as follows: suppose that the level of liquid does not immerse the reflecting prism 14 of the window being viewed. Then red rays from the adjacent lamp 19 will penetrate the reflecting prism 14 and be reflected from the inclined end surface thereof in the direction of and through the glass 9 to be seen by the observer. The observer will thus know by observation of these rays that the liquid level must be below that window.

Now suppose the liquid level is above that of the reflecting prism next observed. Rays from the lamp 19 thereof will penetrate that lens 14 but instead of being reflected from the inclined outer surface thereof will pass through this surface and be partially absorbed by and partially reflected back by the side-walls of the bore 6 so that they will not be directed toward the glass 9. The observer will see darkness and thus know that the liquid level covers the window being observed, provided the light 19 opposite thereto is illuminated. He may verify that by glancing at or into the adjacent opening 22.

Fig. 5 illustrates what may be termed the converse of the foregoing in which the observed window will show light rays instead of darkness for the submerged windows. In this case the reflecting prism 14 is replaced by a light deflecting means or reflecting prism 23 having the positioning shoulder 24 corresponding to the shoulder 15 and adapted to be assembled in exactly the same manner as above described. The reflecting prism 23 has an inclined outer surface 25 which is silvered or otherwise coated with a reflective material. The wall 26 adjacent the glass 27, which corresponds to the glass 9, is corrugated to form a plurality of small prisms or faces each parallel to or normal to the silvered surface 25 and hence forming right angles with each other.

If a window is observed in which the reflecting prism 23 is not submerged light rays from the adjacent lamp 19 will pass into the reflecting prism, then be reflected by the surface 25, then be reflected by one of the inclined surfaces of the face 26 against another face thereof, then back toward the surface 25 and back toward the light source. The glass 27 does not receive the rays and the observer will see only darkness.

Now suppose that the observer views another window in which the reflecting prism 23 is submerged. Light rays will be reflected by the surface 25 toward the surface 26 and the rays will pass this surface for penetration of the glass 27 so that the observer will see them and thus be informed of the fact that the liquid level covers that window.

Other forms and arrangements of reflecting prisms will suggest themselves to one skilled in the art.

What is claimed is:

1. A gauge for indicating liquid levels comprising a gauge body having a passageway longitudinally therethrough and connections from each end of said passageway to a liquid reservoir, a set of transparent windows set into said gauge body along the length thereof and exposed to said passageway, a second set of transparent windows through said gauge body also exposed to said passageway, each window of each of said sets being at a height along said body corresponding to the height of a window of the other set, said windows each being formed by a threaded bore having a transparent glass inset therein, a hollow plug threaded into said bore and gaskets inwardly and outwardly of said glass accepting the pressure imposed on said glass by said plug, a source of light adjacent each window of one of said sets, and a reflecting prism in said passageway at the height of each of said windows, means individual to each of the last named set of windows for directing a beam of light from said source through its adjacent window into the adjacent reflecting prism, each of said reflecting prisms being constructed and arranged to deflect rays from said light source and from said means and through its other adjacent window, or not, depending on whether said reflecting prism is or is not immersed in liquid.

2. A gauge for indicating liquid levels comprising a gauge body having a pasageway longitudinally therethrough and connections from each end of said passageway to a liquid reservoir, a set of transparent windows set into said gauge body along the length thereof and exposed to said pasageway, a second set of transparent windows in said gauge body also exposed to said passageway, each window of each of said sets being at a height along said body corresponding to the height of a window of the other set, a source of light adjacent each window of one of said sets, and a reflecting prism in said passageway at the height of each of said windows, each said reflecting prism being of prismatic shape having one surface normal to the axis of one of said windows, another surface normal to the axis of the other of said windows, and a third surface forming a 45° angle with both of said other surfaces, said third surface being silvered to constitute a mirror surface, another of said surfaces furthest removed from said light source as measured by the travel of a light beam from said source being composed of a plurality of small inclined surfaces.

3. A gauge for indicating liquid levels comprising a gauge body having a passageway longitudinally therethrough and connections from each end of said passageway to a liquid reservoir, a set of transparent windows set into said gauge body along the length thereof and exposed to said passageway, a second set of transparent windows in said gauge body also exposed to said passageway, each window of each of said sets being at a height along said body corresponding to the height of a window of the other set, a source of light adjacent each window of one of said sets, and a reflecting prism in said passageway at the height of each of said windows, said reflecting prisms each being constructed and arranged to deflect rays from said light source through one adjacent window and through its other adjacent window, or not, depending on whether said prisms is or is not immersed in liquid, said sources of light all being contained in a housing, said housing having an observation opening therethrough at the level of each of said sources, said housing also covering one set of said windows, the other set of said windows serving for observation of the liquid level.

4. A gauge for indicating liquid levels comprising a gauge body having a passageway longitudinally therethrough and connections from each end of said passageway to a liquid reservoir, a set of transparent windows set into said gauge body along the length thereof and exposed to said passageway, a second set of transparent windows in said gauge body also exposed to said passageway, each window of each of said sets being at a height along said body corresponding to the height of a window of the other set, said windows each being formed by a threaded bore having a transparent glass inset therein, a hollow plug threaded into said bore and gaskets inwardly and outwardly of said glass accepting the pressure imposed on said glass by said plug, a source of light adjacent each window of one of said sets, and a reflecting prism in said passageway at the height of each of said windows, said prisms each having one surface normal to the axis of one of said windows, another surface normal to the axis of the other of said windows and a third surface forming a 45° angle with both of said other surfaces, said sources of light all being contained in a housing, said housing having an observation opening therethrough at the level of each of said sources, said housing also covering one set of said windows, the other set of said windows serving for observation of the liquid level.

HARRY E. BRELSFORD.